United States Patent [19]
Wilson

[11] Patent Number: 5,382,059
[45] Date of Patent: Jan. 17, 1995

[54] HOSE ASSEMBLY, HOSE COUPLING AND A PART THEREFOR AND METHODS OF MAKING THE SAME

[75] Inventor: Samuel L. Wilson, Greenfield, Mo.
[73] Assignee: Dayco Products, Inc., Dayton, Ohio
[21] Appl. No.: 180,597
[22] Filed: Jan. 13, 1994
[51] Int. Cl.⁶ ........................................... F16L 33/207
[52] U.S. Cl. .................................... 285/256; 285/259; 29/508
[58] Field of Search ............... 285/256, 259, 257, 258, 285/239, 328; 29/508

[56] References Cited

U.S. PATENT DOCUMENTS

| | | | |
|---|---|---|---|
| 2,446,599 | 8/1948 | Knaggs | 285/259 |
| 3,160,428 | 12/1964 | Goodall | 285/259 |
| 3,347,571 | 10/1967 | New | 285/256 |
| 3,539,207 | 11/1970 | Harris | 285/259 |
| 4,369,992 | 1/1983 | Fournier et al. | 285/259 |
| 4,653,779 | 3/1987 | Foster | 285/256 |
| 4,758,029 | 7/1988 | Davis | 285/259 |
| 5,044,671 | 9/1991 | Chisnell et al. | 285/256 |
| 5,255,944 | 10/1993 | Blin et al. | 285/259 |

FOREIGN PATENT DOCUMENTS

| | | | |
|---|---|---|---|
| 405245 | 1/1991 | European Pat. Off. | 285/256 |
| 1402291 | 8/1975 | United Kingdom | 285/259 |

*Primary Examiner*—Eric K. Nicholson
*Attorney, Agent, or Firm*—Joseph V. Tassone

[57] ABSTRACT

A hose assembly, a hose coupling and a part therefor and methods of making the same are provided, the hose assembly having a tubular insert portion of a hose coupling inserted into one end of a hose, the external peripheral surface of the insert portion having a plurality of spaced apart annular ridges and having a plurality of spaced apart annular grooves therein that are separated from each other by the annular ridges so that the insert portion has medial grooves intermediate opposite end grooves thereof, the end grooves being narrower than the medial grooves.

26 Claims, 3 Drawing Sheets

HOSE ASSEMBLY, HOSE COUPLING AND A PART THEREFOR AND METHODS OF MAKING THE SAME

BACKGROUND OF THE INVENTION

1. Field of the Invention

This invention relates to a new hose assembly, a new hose coupling and a new insert portion of the hose coupling as well as to new methods of making the same.

2. Prior Art Statement

It is known to provide a hose assembly comprising a hose coupling having an annular recess, and a hose having an end thereof clamped in the annular recess of the coupling, the coupling having a longitudinal axis and comprising a tubular insert portion inserted into the one end of the hose and having an external peripheral surface means that is generally parallel to the longitudinal axis, and a tubular ferrule portion disposed in generally concentric and spaced relation about the insert portion to define the annular recess therebetween and having been radially inwardly deformed toward the longitudinal axis to clamp the end of the hose between the ferrule portion and the insert portion after the end of the hose has been received in the annular recess, the external peripheral surface means of the insert portion having a plurality of spaced apart annular ridge means and having a plurality of spaced apart annular groove means therein that are separated from each other by the annular ridge means so that the insert portion has medial groove means intermediate opposite end groove means thereof, the end groove means and the medial groove means having generally the same dimensions. For example, see the U.S. Pat. No. 4,653,779 to Foster.

SUMMARY OF THE INVENTION

It is one of the features of this invention to provide a new insert portion for a hose coupling wherein the insert portion is less likely to collapse under the force of the ferrule of the hose coupling being inwardly crimped to clamp an end of a hose between the ferrule and the insert portion.

In particular, it was found according to the teachings of this invention that in a prior known hose coupling, the retention grooves of the insert portion thereof are disposed in the middle of the insert portion whereby the rubber or material of the end of the hose being trapped in the middle portion of the resulting crimped assembly has nowhere to go but toward the insert portion and, therefore, sometimes results in a collapse of such middle portion of the insert portion whereby the holding power of the prior known hose coupling on the end of the hose crimped thereto is greatly reduced.

However, it was found according to the teachings of this invention that the insert portion can be changed to create a place for the rubber or material of the hose in the middle portion of the assembly to go and to change the gripping portions of the insert portion to more suitable locations.

In particular, it was found according to the teachings of this invention that the opposite end groove means can be formed to be retention groove means while the medial groove means disposed therebetween can be formed to create voids to receive the rubber or material of the hose that is being crimped toward the insert portion so as to tend to prevent collapse of the middle portion of the insert portion.

For example, one embodiment of this invention comprises a hose assembly comprising a hose coupling having an annular recess, and a hose having an end thereof clamped in the annular recess of the coupling, the coupling having a longitudinal axis and comprising a tubular insert portion inserted into the one end of the hose and having an external peripheral surface means that is generally parallel to the longitudinal axis, and a tubular ferrule portion disposed in generally concentric and spaced relation about the insert portion to define the annular recess therebetween and having been radially inwardly deformed toward the longitudinal axis to clamp the end of the hose between the ferrule portion and the insert portion after the end of the hose has been received in the annular recess, the external peripheral surface means having a plurality of spaced apart annular ridge means and having a plurality of spaced apart annular groove means therein that are separated from each other by the annular ridge means so that the insert portion has medial groove means intermediate opposite end groove means thereof, the end groove means being narrower than the medial groove means.

Accordingly, it is an object of this invention to provide a new hose assembly having one or more of the novel features of this invention as set forth above or hereinafter shown or described.

Another object of this invention is to provide a new method of making such a hose assembly, the method of this invention having one or more of the novel features of this invention as set forth above or hereinafter shown or described.

Another object of this invention is to provide a new hose coupling having one or more of the novel features of this invention as set forth above or hereinafter shown or described.

Another object of this invention is to provide a new method of making such a new hose coupling, the method of this invention having one or more of the novel features of this invention as set forth above or hereinafter shown or described.

Another object of this invention is to provide a new insert portion for a hose coupling, the insert portion of this invention having one or more of the novel features of this invention as set forth above or hereinafter shown or described.

Another object of this invention is to provide a new method of making such an insert portion, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
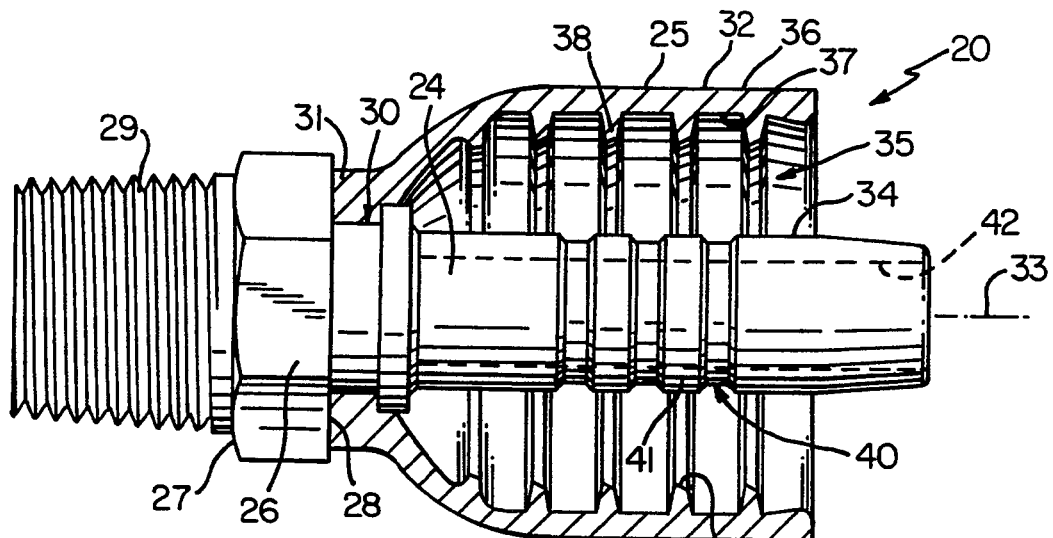
FIG. 1 is a side view of a prior known hose coupling wherein the ferrule thereof is shown in cross section.

While the various features of this invention are hereinafter illustrated and described as being particularly adapted to provide a hose coupling for a particular tubular hose, it is to be understood that the various features of this invention can be utilized singly or in various combinations thereof to provide a hose coupling for other types of tubular hoses as desired.

Therefore, this invention is not to be limited to only the embodiment illustrated in the drawings, because the drawings are merely utilized to illustrate one of the wide variety of uses of this invention.

Figure 2:
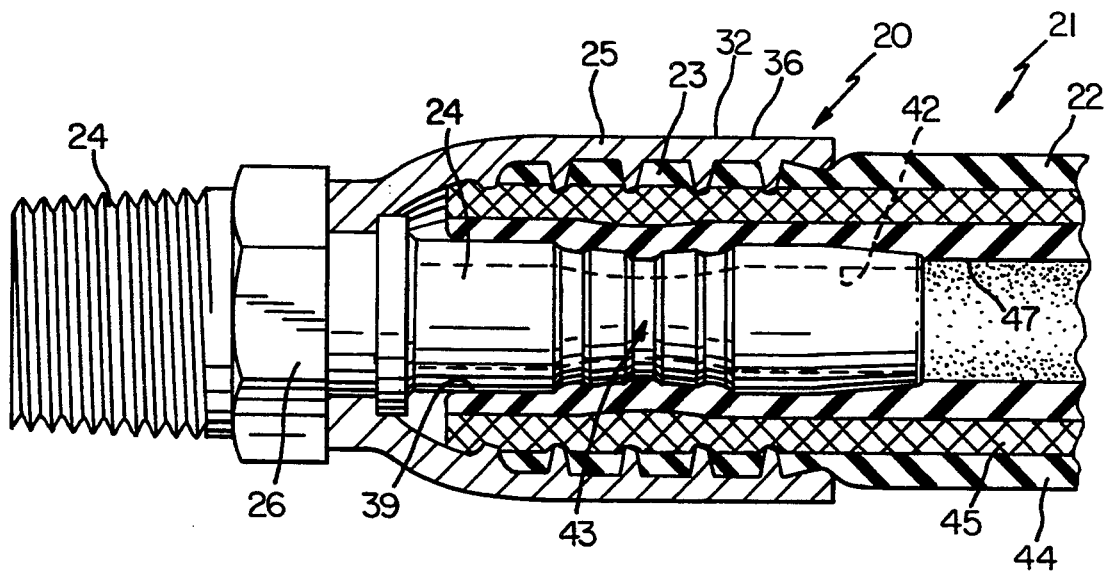
FIG. 2 is a view similar to FIG. 1 and illustrates the hose coupling of FIG. 1 crimped to an end of a hose to form a prior known hose assembly therewith.

Referring now to FIG. 1, a prior known hose coupling is generally indicated by the reference numeral 20 and is illustrated in FIG. 2 as forming part of a prior known hose assembly that is generally indicated by the reference numeral 21 and comprising the hose coupling 20 and a flexible hose 22 having one end 23 thereof clamped or crimped between an insert portion 24 of the hose coupling 20 and a tubular ferrule 25 of the hose coupling 20 in a manner well known in the art. For example, see the aforementioned U.S. Pat. No. 4,653,779 to Foster whereby this U.S. patent is being incorporated into this disclosure by this reference thereto.

Therefore, since the structure, materials and method of making the hose assembly 21 is well known in the art, only the features thereof believe necessary to fully understand the features of this invention will now be set forth.

The coupling 20 has a body member 26 that comprises a nut portion of the coupling 20 and has opposed sides 27 and 28, a tubular externally threaded portion 29 being formed integrally and one-piece with the body portion 26 and extending outwardly therefrom so as to be adapted to threadedly couple the hose coupling 20 to any desired structure in a manner well known in the art.

The insert portion 24 extends outwardly from the side 28 of the body portion 26 and is integral and one-piece therewith, the insert portion 24 defining an annular recess 30 with the side 28 of the body portion 26 in which an end portion 31 of the tubular ferrule 25 has been crimped in order to fasten the ferrule 25 to the insert portion 24 in a manner well known in the art.

The ferrule 25 has a tubular portion 32 that is disposed generally concentric to a longitudinal axis 33 of the insert portion 24 and cooperates with the external peripheral surface means 34 of the insert portion 24 to define an annular recess means 35 therebetween, the tubular portion 32 of the ferrule 25 having an external peripheral surface 36 and an internal peripheral surface 37 with the internal peripheral surface 37 having a plurality of annular and spaced apart ridge means 38 that are adapted to dig into the end 23 of the hose 22 after the end 23 of the hose 22 has been inserted into the recess 35 in such a manner that also causes the insert portion 24 to be telescoped into a passage means 39 passing through the hose 22 whereby the passage means 39 of the hose 22 is disposed in fluid communication with a passage means 42 extending through the insert portion 24 as well as through the body member 26 and extension 29.

While the body portion 32 of the ferrule 25 can be radially inwardly crimped toward the insert portion 24 to complete the hose assembly 21 in any suitable manner, one such crimping apparatus and method is set forth in the U.S. Pat. No. 4,625,539 to Brooks et al, whereby this U.S. patent is being incorporated into this disclosure by this reference thereto.

The insert portion 24 of the coupling 20 has a plurality of annular grooves 40 formed in the external peripheral surface means 34 thereof in spaced apart relation and being generally of the same size and being spaced from each other by annular ridge means 41 of the external peripheral surface means 34 with the annular ridge means 40 likewise being substantially of the same size.

As previously stated, it has been found that when the portion 32 of the ferrule 25 is being inwardly crimped toward the insert portion 24 to crimp the end 23 of the hose 22 therebetween as illustrated in FIG. 2, the insert portion 24 tends to collapse in the middle area or portion thereof as represented by the reference numeral 43 in FIG. 2 and it is believed that this collapse is the result of the rubber or material of the end 23 of the hose 22 being trapped in the middle portion of the crimped assembly with nowhere to go but toward the insert portion 24. While this rubber or material can flow out both ends of the middle portion 43 to some degree, it is still believed that that portion of that rubber or material needs somewhere to go.

Since one is relaying on the annular grooves 40 to retain the coupling 20 on the end 23 of the hose 22, this inward collapse of the middle portion 43 of the insert portion 24 reduces the holding capacity of the grooves 40 so that a pulling force that axially separates the coupling 20 from the hose 22 is not as great as when the insert portion 24 remains in its noncollapsed condition as illustrated in FIG. 1.

While the hose 22 can be any structure that is mainly formed of polymeric material as is conventional in the art, usually the hose 22 comprises a polymeric body 44 formed of synthetic or natural rubber and having an annular reinforcement 45, such as a metal or fabric braid means, disposed intermediate an external peripheral surface 46 and an internal peripheral surface 47 of the hose 22 as illustrated. However, it is to be understood that any other suitable hose can be utilized with the coupling 20 as desired.

Figure 3:
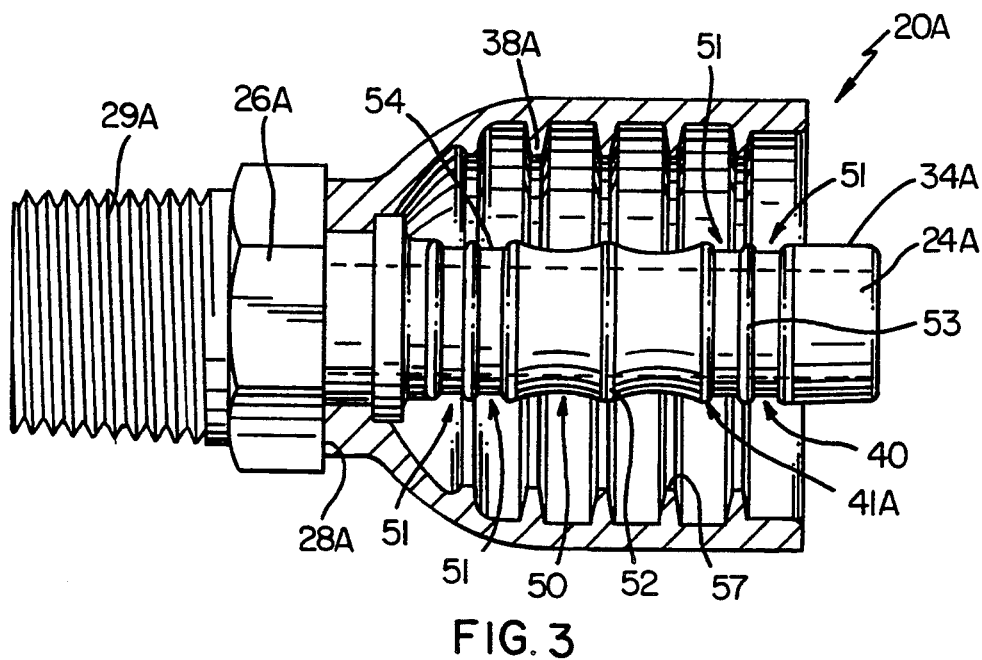
FIG. 3 is a view similar to FIG. 1 and illustrates the new hose coupling of this invention.
Figure 4:
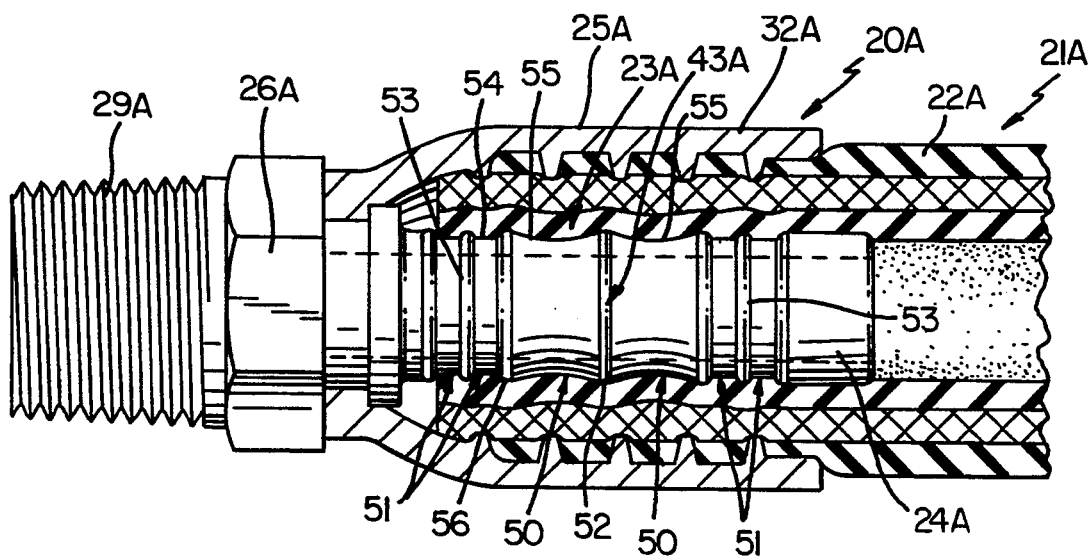
FIG. 4 is a view similar to FIG. 3 and illustrates the hose coupling of this invention crimped to an end of a hose to form the new hose assembly of this invention.
Figure 5:
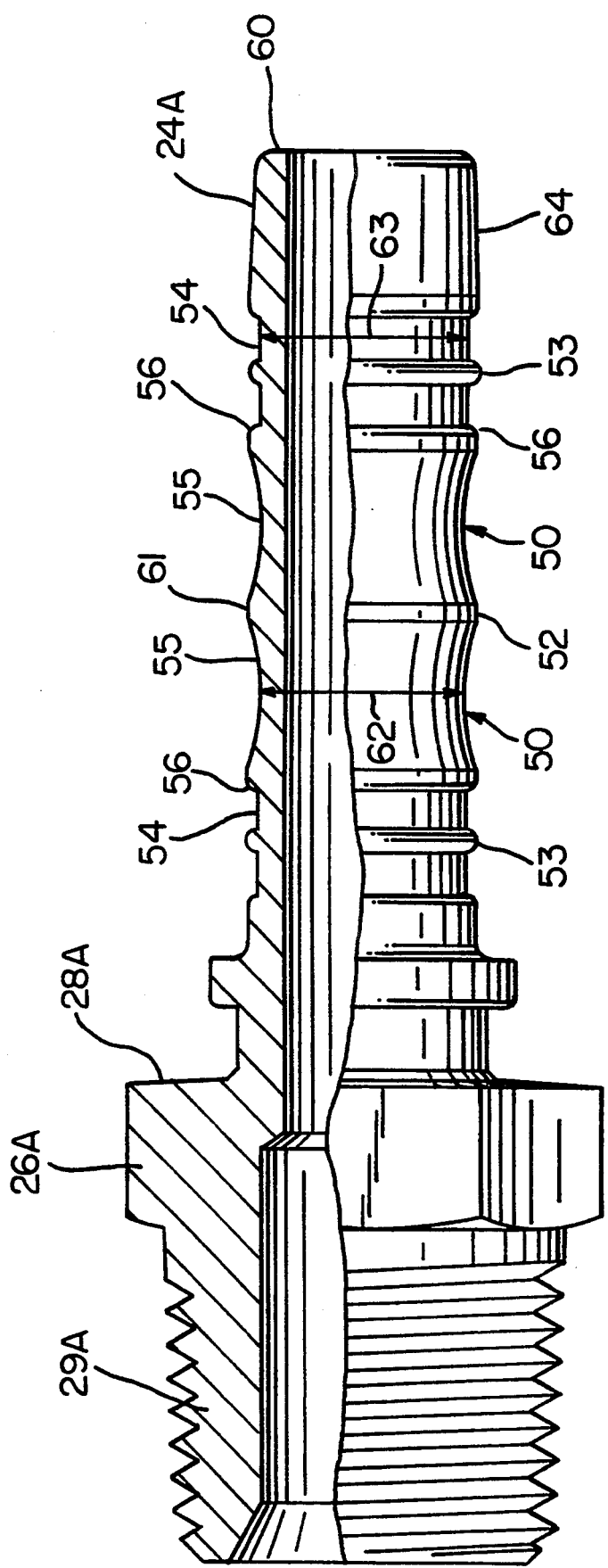
FIG. 5 is an enlarged side view, partially in cross section, and illustrating the new insert portion of this invention that is utilized to form the new hose coupling of FIG. 3 and the new hose assembly of FIG. 4.

Referring now to FIGS. 3–5, the new hose assembly of this invention is generally indicated by the reference numeral 21A and parts thereof that are similar to the parts of the prior known hose assembly 21 are indicated by like reference numerals followed by the reference letter "A".

Therefore, the new coupling of this invention is generally indicated by the reference numeral 20A and the new insert portion of the coupling 20A is indicated by the reference numeral 24A, such new insert portion 24A being illustrated in an enlarged manner in FIG. 5.

The groove means 40A and ridge means 41A that define the external peripheral surface means 34A of the insert portion 24A of the coupling 20A of this invention are uniquely formed so as to define medial groove means that are generally indicated by the reference numeral 50 and opposite end groove means that are each generally indicated by the reference numeral 51. While it is believed that any suitable number, one or more, of medial groove means 50 can be utilized and that any suitable number, one or more, of end groove means 51 can be disposed on opposite sides of the medial groove means 50, it can be seen that the one working embodiment of the insert portion 24A of this invention that is illustrated in the drawings comprises two like medial groove means 50 and two like end groove means 51 on each side of the medial groove means 50, the width of the medial groove means 50 being substantially wider than the width of the end groove means 51 so as to permit the rubber or other material of the end 23A of the hose 22A to flow therein away from middle portion 43A of the insert means 24A during the radially inwardly collapsing of the body portion 32A of the ferrule 25A when crimping the end 23A of the hose 22A between the ferrule 25A and the insert portion 24A as previously described so as to tend to prevent an inward collapsing of the middle portion 43A whereby the end grooves 51 provide the means for retaining the crimped coupling 20A on the end 23A of the hose 22A. In fact, in preliminary testing in side-by-side comparisons it has been found that the working embodiment of the insert 24A of this invention resulted in approximately 30% greater holding power with as much as 50% less collapse than the prior known arrangement illustrated in FIGS. 1 and 2.

It can be seen that the medial grooves 50 of this invention have an annular ridge means 52 therebetween while each end groove means 51 has an annular ridge means 53 therebetween. Also, it can be seen that each end groove means 51 defines a longitudinal external cross-sectional configuration defined by a substantially straight line 54 while each medial groove means 50 defines a longitudinal external cross-sectional configuration defined by an arcuate concave line 55 that extends from the annular ridge means 52 to an annular ridge means 56 that cooperates with an adjacent annular ridge means 53 to define one of the end groove means 51 therebetween.

It is believed that by providing the radius voids of the medial groove means 50, not only do the voids created by the medial groove means 50 provide places for the rubber of the hose 22 to enter during the crimping operation, but also the radiused surfaces 55 change the direction of the forces on the insert portion 24A to be angular rather than truly perpendicular as is the case in the holding grooves 51 as well as in the grooves 40 of the prior art insert portion 24 and thereby give a greater cross section to resist collapse. In addition, the ring created by the annular ridge means 52 between the two medial groove means 50 adds additional strength where the insert portion 24A is most prone to collapse. Thus, it is believed that the crimping force is then shifted to the end groove means 51 where collapse is not a problem.

Accordingly, it can be seen that it is a relatively simple method of this invention to form the insert portion 24A with the unique medial groove means 50 and opposite end groove means 51 with the opposite end groove means 51 being narrower than the medial groove means 50 to function in the manner previously set forth to provide for a greater holding or retention of the coupling 20A on the end 23A of the hose 22A when the crimping operation is performed in the manner previously set forth, such as by the crimping apparatus of the aforementioned U.S. Pat. No. 4,625,539 to Brooks et al.

While the ferrule 25A forming the coupling 20A of this invention has the annular projections or ridge means 38A provided with flat inner surfaces 57 rather than angled surfaces 58 as illustrated in FIGS. 1 and 2 and as set forth in the aforementioned U.S. Pat. No. 4,653,779 to Foster, it is to be understood that the surfaces 57 of the ferrule 25A could be angled if desired and also the ferrule being utilized with the insert means 24A of this invention can be provided without annular ridges 38A or with other types of gripping structure as desired.

While the insert means 24A, as well as the body means 26A and the threaded portion 29A can be formed of any suitable material and in any suitable manner, the one working embodiment thereof previously described has been formed of cold drawn carbon steel with the insert means 24A having an outside diameter of approximately 0.380 of an inch and an inside diameter of approximately 0.262 of an inch and a length from the side 28A of the body portion 26A to a free end surface 60 of approximately 1.540 inches whereby the apexes of the ridge means 52, 53 and 56 define diameters that are each approximately 0.380 of an inch. In addition, the ridge means 53 are each rounded so as to be described by a radius of approximately 0.021 of an inch whereas the annular ridge means 52 intermediate the two medial groove means 50 is approximately 0.030 of an inch wide and is generally defined by a substantially straight line as represented by the reference numeral 61 in FIG. 5 with the ends thereof that join the arcuate line 55 being rounded to feather therewith as desired. Similarly, the lines 55 are rounded or feathered where they join the annular ridge means 56 with the width of the annular ridge means 56 being approximately 0.030 of an inch. Each medial groove means 50 has the arcuate concave line 55 thereof defined by a radius of approximately 0.400 of an inch and with the distance between the annular ridge means 52 and 56 being approximately 0.250 of an inch. In this manner, the outside diameter of the bottom of each medial groove 50 is defined by a diameter 62 in FIG. 5 that is approximately 0.340 of an inch. The bottom 54 of the annular end grooves 51 each define a diameter 63 that is approximately 0.350 of an inch and each has a width of approximately 0.069 of an inch while the annular ridges 53 each has a width of approximately 0.041 of an inch. An end surface 64 of the insert means 24A is tapered toward the end 60 at an angle of approximately two degrees in order to facilitate insertion of the insert portion 24A into the hose 22A as previously described. The overall length of the member comprising the sections 24A, 26A and 29A is approximately 2.360 of an inch.

While the hose 22A utilized with such an insert 24A could have any suitable outside diameter, the same can have an outside diameter of approximately 0.780 of an inch.

Also, while the insert portion 24A has been illustrated and described as being integral and one-piece with the body portion 26A, it is to be understood that the insert portion 24A can be formed separate from the body portion 26A and then be secured thereto in any suitable manner well known in the art.

Thus, it can be seen that this invention not only provides a new hose assembly, a new hose coupling and a new insert portion for a hose coupling, but also this invention provides new methods of making the same.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a hose assembly comprising a hose coupling having an annular recess, and a hose having an end thereof clamped in said annular recess of said coupling, said coupling having a longitudinal axis and comprising a tubular insert portion inserted into said one end of said hose and having an external peripheral surface means that is generally parallel to said longitudinal axis, and a tubular ferrule portion disposed in generally concentric and spaced relation about said insert portion to define said annular recess therebetween and having been radially inwardly deformed toward said longitudinal axis to clamp said end of said hose between said ferrule portion and said insert portion after said end of said hose has been received in said annular recess, said external peripheral surface means having a plurality of spaced apart annular ridge means and having a plurality of spaced apart annular groove means therein that are separated from each other by said annular ridge means so that said insert portion has medial groove means intermediate opposite end groove means thereof, the improvement wherein said end groove means are narrower than said medial groove means.

2. A hose assembly as set forth in claim 1 wherein said medial groove means comprise two like annular grooves having one of said annular ridge means therebetween.

3. A hose assembly as set forth in claim 2 wherein said one annular ridge means comprises an annular section of said external peripheral surface means that has a longitudinal external cross-sectional configuration defined by a substantially straight line.

4. A hose assembly as set forth in claim 2 wherein each said two like annular grooves has a longitudinal external cross-sectional configuration defined by an arcuate concave line that is defined by a radius.

5. A hose assembly as set forth in claim 1 wherein each of said end groove means comprise two like annular grooves having one of said annular ridge means therebetween.

6. A hose assembly as set forth in claim 5 wherein said one annular ridge means comprises an annular section of said external peripheral surface means that has a longitudinal external cross-sectional configuration defined by an arcuate convex line that is defined by a radius.

7. A hose assembly as set forth in claim 5 wherein each of said two like annular grooves has a longitudinal external cross-sectional configuration defined by a substantially straight line.

8. A hose assembly as set forth in claim 1 wherein said ferrule portion has a plurality of inwardly directed and axially spaced apart annular ridge means deformed into said end of said hose.

9. In a hose coupling adapted to be attached to an end of a tubular hose, said coupling having a longitudinal axis and comprising a tubular insert portion adapted to be inserted into said one end of said hose and having an external peripheral surface means that is generally parallel to said longitudinal axis, and a tubular ferrule portion disposed in generally concentric and spaced relation about said insert portion to define an annular recess therebetween and being adapted to be radially inwardly deformed toward said longitudinal axis to clamp said end of said hose between said ferrule portion and said insert portion after said end of said hose has been received in said annular recess, said external peripheral surface means having a plurality of spaced apart annular ridge means and having a plurality of spaced apart annular groove means therein that are separated from each other by said annular ridge means so that said insert portion has medial groove means intermediate opposite end groove means thereof, the improvement wherein said end groove means are narrower than said medial groove means.

10. A hose coupling as set forth in claim 9 wherein said medial groove means comprise two like annular grooves having one of said annular ridge means therebetween.

11. A hose coupling as set forth in claim 10 wherein said one annular ridge means comprises an annular section of said external peripheral surface means that has a longitudinal external cross-sectional configuration defined by a substantially straight line.

12. A hose coupling as set forth in claim 10 wherein each said two like annular grooves has a longitudinal external cross-sectional configuration defined by an arcuate concave line that is defined by a radius.

13. A hose coupling as set forth in claim 9 wherein each of said end groove means comprise two like annular grooves having one of said annular ridge means therebetween.

14. A hose coupling as set forth in claim 13 wherein said one annular ridge means comprises an annular section of said external peripheral surface means that has a longitudinal external cross-sectional configuration defined by an arcuate convex line that is defined by a radius.

15. A hose coupling as set forth in claim 13 wherein each of said two like annular grooves has a longitudinal external cross-sectional configuration defined by a substantially straight line.

16. A hose coupling as set forth in claim 9 wherein said ferrule portion has a plurality of inwardly directed and axially spaced apart annular ridge means adapted to be deformed into said end of said hose.

17. In an insert portion for a hose coupling that is adapted to be attached to an end of a tubular hose, said coupling having a longitudinal axis and comprising said tubular insert portion adapted to be inserted into said one end of said hose and having an external peripheral surface means that is generally parallel to said longitudinal axis, and a tubular ferrule portion adapted to be disposed in generally concentric and spaced relation about said insert portion to define an annular recess therebetween and being adapted to be radially inwardly deformed toward said longitudinal axis to clamp said end of said hose between said ferrule portion and said insert portion after said end of said hose has been received in said annular recess, said external peripheral surface means having a plurality of spaced apart annular ridge means and having a plurality of spaced apart annular groove means therein that are separated from each other by said annular ridge means so that said insert portion has medial groove means intermediate opposite end groove means thereof, the improvement wherein said end groove means are narrower than said medial groove means.

18. An insert portion for a hose coupling as set forth in claim 17 wherein said medial groove means comprise two like annular grooves having one of said annular ridge means therebetween.

19. An insert portion for a hose coupling as set forth in claim 18 wherein said one annular ridge means comprises an annular section of said external peripheral surface means that has a longitudinal external cross-sectional configuration defined by a substantially straight line.

20. An insert portion for a hose coupling as set forth in claim 18 wherein each said two like annular grooves has a longitudinal external cross-sectional configuration defined by an arcuate concave line that is defined by a radius.

21. An insert portion for a hose coupling as set forth in claim 17 wherein each of said end groove means comprise two like annular grooves having one of said annular ridge means therebetween.

22. An insert portion for a hose coupling as set forth in claim 21 wherein said one annular ridge means comprises an annular section of said external peripheral surface means that has a longitudinal external cross-sectional configuration defined by an arcuate convex line that is defined by a radius.

23. An insert portion for a hose coupling as set forth in claim 21 wherein each of said two like annular grooves has a longitudinal external cross-sectional configuration defined by a substantially straight line.

24. In a method of making a hose assembly comprising a hose coupling having an annular recess, and a hose having an end thereof clamped in said annular recess of said coupling, said coupling having a longitudinal axis and comprising a tubular insert portion inserted into said one end of said hose and having an external peripheral surface means that is generally parallel to said longitudinal axis, and a tubular ferrule portion disposed in generally concentric and spaced relation about said insert portion to define said annular recess therebetween and having been radially inwardly deformed toward said longitudinal axis to clamp said end of said hose between said ferrule portion and said insert portion after said end of said hose has been received in said annular recess, said external peripheral surface means having a plurality of spaced apart annular ridge means and having a plurality of spaced apart annular groove means therein that are separated from each other by said annular ridge means so that said insert portion has medial groove means intermediate opposite end groove means thereof, the improvement comprising the step of forming said end groove means to be narrower than said medial groove means.

25. In a method of making a hose coupling adapted to be attached to an end of a tubular hose, said coupling having a longitudinal axis and comprising a tubular insert portion adapted to be inserted into said one end of said hose and having an external peripheral surface means that is generally parallel to said longitudinal axis, and a tubular ferrule portion disposed in generally concentric and spaced relation about said insert portion to define an annular recess therebetween and being adapted to be radially inwardly deformed toward said longitudinal axis to clamp said end of said hose between said ferrule portion and said insert portion after said end of said hose has been received in said annular recess, said external peripheral surface means having a plurality of spaced apart annular ridge means and having a plurality of spaced apart annular groove means therein that are separated from each other by said annular ridge means so that said insert portion has medial groove means intermediate opposite end groove means thereof, the improvement comprising the step of forming said end groove means to be narrower than said medial groove means.

26. In a method of making an insert portion for a hose coupling that is adapted to be attached to an end of a tubular hose, said coupling having a longitudinal axis and comprising said tubular insert portion adapted to be inserted into said one end of said hose and having an external peripheral surface means that is generally parallel to said longitudinal axis, and a tubular ferrule portion adapted to be disposed in generally concentric and spaced relation about said insert portion to define an annular recess therebetween and being adapted to be radially inwardly deformed toward said longitudinal axis to clamp said end of said hose between said ferrule portion and said insert portion after said end of said hose has been received in said annular recess, said external peripheral surface means having a plurality of spaced apart annular ridge means and having a plurality of spaced apart annular groove means therein that are separated from each other by said annular ridge means so that said insert portion has medial groove means intermediate opposite end groove means thereof, the improvement comprising the step of forming said end groove means to be narrower than said medial groove means.

* * * * *